United States Patent [19]

Daubman et al.

[11] 4,343,700

[45] Aug. 10, 1982

[54] CENTRIFUGE FILTER

[75] Inventors: Edward A. Daubman, Fallbrook; William G. Owler, Jr., Escondido, both of Calif.

[73] Assignee: Ametek, Inc., New York, N.Y.

[21] Appl. No.: 237,286

[22] Filed: Feb. 23, 1981

[51] Int. Cl.³ .............................................. B01D 33/06
[52] U.S. Cl. .................................. 210/232; 210/380.1
[58] Field of Search ..................... 210/232, 237, 380.1, 210/380.3, 381, 398, 399, 402, 403

[56] References Cited

U.S. PATENT DOCUMENTS 630,365   8/1899  Laplace ............................ 210/380.1
2,770,181  11/1954  Kahan ................................... 99/298
3,283,909  11/1966  Daubman .......................... 210/380

Primary Examiner—John Adee
Attorney, Agent, or Firm—Amster, Rothstein & Engelberg

[57] ABSTRACT

A filtration assembly including a perforate basket, screen and filtration media is provided with bands of complementary releasable attachment means along mating surfaces. The complementary releasable attachment means permit the backing screen and filtration media to be installed in and removed from the perforate basket simply without tools, while retaining the backing screen and filtration media in proper alignment with the perforate basket during the filtration process.

2 Claims, 3 Drawing Figures

U.S. Patent Aug. 10, 1982 4,343,700
FIG. 1.
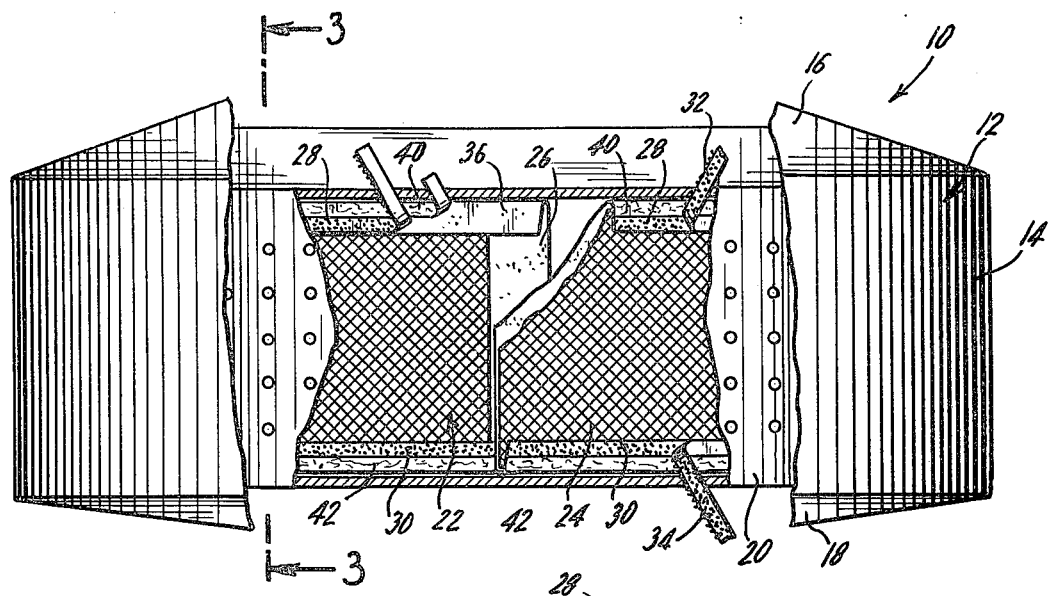
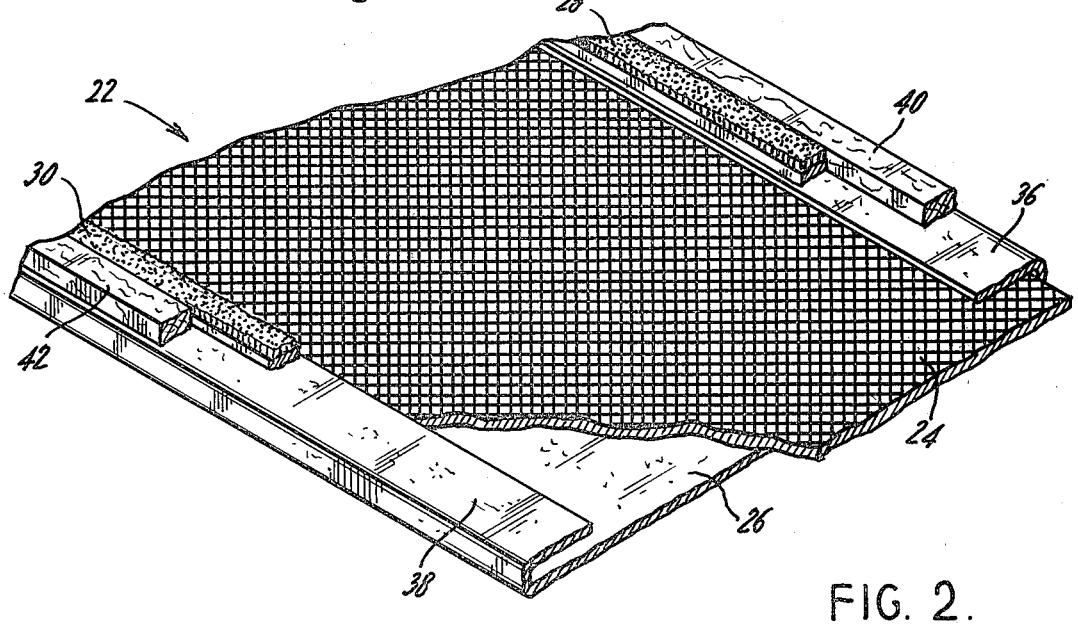
FIG. 2.
FIG. 3.
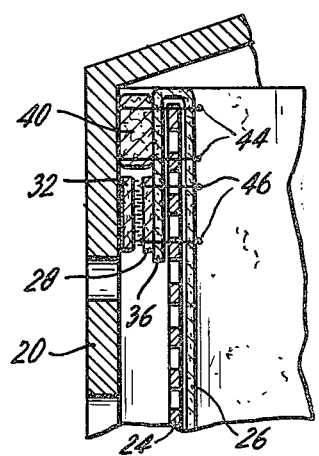

CENTRIFUGE FILTER

DESCRIPTION OF THE INVENTION

This invention relates in general to filter apparatus, and in particular to an improved filtration assembly for use in centrifuge-type filter apparatus and the like.

The separation of liquids from solids occurs in a multitude of chemical processes to filter a solid from a liquid-solid suspension; to dehydrate a solid; to clarify a liquid; to thicken a suspension; and for other tasks. Such separation is normally carried out in filtration equipment which is typically in the form of a vacuum, pressure or centrifugal filter. In each, a solid-containing liquid is passed through a filter media. The solid remains on the filter media while the clarified liquid passes through the media. Depending on the process in which the filter is employed, either the solid material, the liquid, or both, are recovered for further processing.

The choice of filter material for a given application depends upon the type of solid-liquid suspension to be acted upon, the specific criteria by which a specific filter media is chosen being well-known in the art. Generally, a filter apparatus is designed to receive and utilize a wide variety of filter media, each of which must be installed within the filter apparatus and removed when the filter apparatus is to be utilized for a different process. In centrifuge-type filters such as manufactured by the Process Equipment Division of Ametek, Inc., for example, the filter media element, which is located about the inner periphery of the centrifuge drum, is retained by use of two retaining rings. In order to replace a filter, the retaining rings must be loosened and removed, the filter installed, and the retaining rings replaced and retightened, necessitating the use of tools to handle the uniweldy rings. Further, access to the interior of the apparatus is normally limited, thus presenting a difficult environment for installation and removal. As a typical centrifuge filter may have a drum from 26 inches to 48 inches in diameter, the installation and removal of a filter media assembly can be a difficult and arduous task.

It is therefore an object of the present invention to provide a filter media assembly which may be installed in filter apparatus without the use of retaining rings.

A further object of the present invention is to provide a filter media assembly which may be installed in and removed from filter apparatus without the use of tools.

A still further object of the present invention is to provide a filter media assembly in which the means for installation is integral with the assembly.

A still further object of the present invention is to provide a filter media assembly in which the means for installation are economical to manufacture.

In accordance with one embodiment of the present invention, a centrifuge filter apparatus drum and removable filter media assembly are provided with complementary releasable attachment means. The complementary releasable attachment means are located about the upper and lower inner periphery of the drum and proximate the top and bottom edges of the filter media assembly so that when the filter media assembly is in place, the respective sections of releasable attachment means on the drum and on the filter media engage each other, thus providing a positive attachment between the filter media and the drum. When it is desired to remove the filter media assembly from the drum, the application of a force perpendicular to the plane of attachment between the drum and filter media permits disengagement of the attachment means and removal of the filter media assembly. Both installation and removal of the filter media assembly can be easily and simply accomplished without the use of tools or special equipment.

The above brief description, as well as further objects, features, and advantages of the present invention will be more fully understood by reference to the following detailed description of a presently preferrred, but nonetheless illustrative embodiment of the present invention when made in conjunction with the accompanying drawings wherein:

FIG. 1 is an elevation view, partially broken away, of a filter apparatus including a filter media assembly embodying the present invention;

FIG. 2 is a perspective view of a section of the filter media assembly of the present invention; and FIG. 3 is a cross-section view taken along line 3—3 of FIG. 1 showing, in detail, how the filter media assembly is installed within the filter apparatus.

Referring to FIG. 1, filter apparatus 10, which may be of the centrifugal type, has filter tank 12 in the general shape of a cylinder with vertical side wall 14, top 16 and bottom 18 providing an essentially closed chamber for the filtration process. Located within the filter tank is a filtration assembly comprising a filter drum, which may take the form of perforate basket 20, which is journaled and driven for rotation within filter tank 12, and filter media assembly 22. Such journal and drive means are not shown. Perforate basket 20 provides the mechanical support for filter media 22, which includes backing 24 and filter media element 26 mounted within perforate basket 20 by releasable attachment means pairs 28 and 32, 30 and 34.

In operation, perforate basket 20 in which filter media assembly 22 is mounted rotates at high speed, typically from 750 to 1600 rpm, within filter tank 12. Solid-containing liquid is directed onto the inside surface of filter media 26 by appropriate piping as perforate basket 14 rotates. Due to the rotation of the basket and filter media assembly a centrifugal force is generated, forcing the liquid radially outward through filter media 26, backing screen 18, and perforate basket 20, while the suspended solid material, being of a size too large to pass though the filter media 26, remains on the inner surface of the media. The filtered liquid is collected by suitable means (not shown) for disposal, further filtering or processing, as required. The solid material is removed from filter media 26 by suitable means (not shown) also for disposal or processing, as required.

FIG. 2 illustrates a section of filter media assembly 22. Backing screen 24, which may be of any suitable material, such as extruded monofilament polypropylene in the form of a coarse open grid, provides a firm, yet flexible support for filter media 26. It also serves to keep filter media 26 away from direct contact with perforate basket 20. Especially with fine pore filter media, the intimate contact between the filter media and the perforate basket inhibits draining of the filtered liquid. Backing screen 24, by supporting filter media 26, promotes drainage and improves filtration efficiency. Backing screen 24 is in the shape of a rectangle, having a length equal to the inner circumference of perforate basket 20 and a width substantially equal to the height of the perforate basket.

Filter media 26, which may be of glass, wool, cotton, nylon, or any other suitable material chosen in consideration of the properties of the materials sought to be filtered, lies upon the inner surface of backing screen 24 and has portions 36 and 38 folded over the top bottom edges of the backing screen. By inner surface it is meant that the surface of backing screen 24 which faces the interior of the filter apparatus. Overlying the folded portions 36 and 38 of filter media 26 on the outside surface of backing screen 24 are sealing strips 40 and 42. These sealing strips, which may be of felt or similar material and are typically one inch wide and one eighth inch in thickness, provide a seal between filter media assembly 22 and perforate basket 20 to insure that there is no leakage of solid-bearing liquid between these members. Located adjacent sealing strips 40 and 42 and extending along the length of backing screen 18 are bands 28 and 30 of the complementary releasable attachment means. Bands 28 and 30 engage with complementary releasable attachments means bands 32 and 34 located on the inner surface of perforate basket 20.

FIG. 3 illustrates the attachment of sealing strip 40 and complementary attachment means band 28 to the filter media assembly 22 and the relationship between filter media assembly 22 and perforate basket 20 when filter media assembly 22 is in position. Filter media 26 and sealing strip 40 are connected to backing screen 24 by dual lines of stitching 44, 44. Similarly, complementary releasable attachment means band 28 is connected to backing screen 24 and filter media 26 by lines of stitching 46. It is to be appreciated that sealing strip 42 and releasable attachment means 30 located along the bottom edge of backing screen 24 are attached in a like manner. Alternatively, sealing strip 40 and complementary releasable attachment means band 28 can be first affixed to filter media 26 by stitching. The filter media can then be attached to the backing screen 24 by other stitching. Other methods of attachment are also possible.

Complementary releasable attachment means bands 32 and 34 on the inner surface of perforate basket 20 are attached thereto by any appropriate means, such as by plastic fasteners.

Complementary releasably attachment means bands 26 and 32, and 30 and 34 each represent a pair of mating members. Each such pair may be of the material manufactured by the 3M Corporation and sold under the trademark SCOTCHMATE, which comprises a backing material with a series of protuberances projecting therefrom. The protuberances on each mating surface are of a type which, when the two surfaces are pressed together, enmesh each other to provide a substantial resisting force to applied forces in the plane parallel to the plane of their mated surfaces. Application of a force perpendicular to the surfaces, however, permits disengagement of the mating surfaces without the need for special tools or excessive force. It is contemplated that other types of releasable attachment means having similar characteristics can be utilized in the present invention.

Filter media assembly 22 is installed within filter apparatus 10 by aligning the assembly within the perforate basket 14 so that complementary releasable attachment means bands 28, 30 are aligned with complementary attachments means bands 32 and 34, respectively, on the perforate basket. Backing screen 24, which is normally of a length corresponding to the inner circumference of perforate basket 20, will then have its ends substantially in alignment. The ends of filter media 26, which normally is of a length greater than the inner circumference of perforate basket 20, can then be overlapped to insure that a continuous filter media surface is presented to the solid-bearing liquid sought to be filtered. Upon the application of a suitable force to the filter media assembly along the location of complementary attachment means bands 28 and 30, the bands engage their respective complementary attachment means bands on perforate basket 20 to provide firm attachment between filter media assembly 22 and perforate basket 20. When removal of filter media assembly is desired, the filter media assembly can be simply pulled away from the perforate basket, thus causing separation of the respective complementary attachment means bands.

While the invention has been described as applied to a specific embodiment, it will be apparent that many modifications and changes may be performed within the scope of the invention claimed, and that such modifications and changes are intended to be embraced by the invention.

We claim:

1. A filtration assembly for use in a centrifuge filter comprising a filter drum, a backing screen having a front and back surface and upper and lower edges adapted to fit about the inner periphery of said filter drum, a filter element attached to and covering said front surface of said backing screen, sealing strips located on said back surface of said backing screen along said upper and lower edges, and complementary releasable mating members located adjacent said sealing members on said back surface of said backing screen and on said filter drum requiring no adjustment to permit the selective attachment and removal of said backing screen and filter media element to and from said filter drum.

2. A filtration assembly as in claim 1 wherein each mating member comprises backing material with a series of protuberances projecting therefrom such that when the mating members are pressed together the protuberances of each member enmesh the protuberances of the other to provide a substantial resisting force to forces applied in the plane parallel to the plane of their backing material.

* * * * *